(12) United States Patent
Matsubara et al.

(10) Patent No.: US 10,625,493 B2
(45) Date of Patent: Apr. 21, 2020

(54) SEALANT FILM AND LAMINATE FILM

(71) Applicant: DIC Corporation, Tokyo (JP)

(72) Inventors: Hiroaki Matsubara, Saitama (JP);
Tatsuhiko Usui, Saitama (JP);
Yoshitaka Satoh, Saitama (JP)

(73) Assignee: DIC Corporation, Tokyo (JP)

( * ) Notice: Subject to any disclaimer, the term of this patent is extended or adjusted under 35 U.S.C. 154(b) by 60 days.

(21) Appl. No.: 15/675,103

(22) Filed: Aug. 11, 2017

(65) Prior Publication Data

US 2017/0341350 A1 Nov. 30, 2017

Related U.S. Application Data

(63) Continuation of application No. PCT/JP2016/058105, filed on Mar. 15, 2016.

(30) Foreign Application Priority Data

Mar. 17, 2015 (JP) .................................. 2015-053404

(51) Int. Cl.

| | |
|---|---|
| *B32B 7/02* | (2019.01) |
| *B32B 27/08* | (2006.01) |
| *B32B 27/32* | (2006.01) |
| *B65D 65/40* | (2006.01) |
| *B32B 27/36* | (2006.01) |
| *B32B 27/30* | (2006.01) |
| *B32B 27/34* | (2006.01) |
| *B32B 7/12* | (2006.01) |

(52) U.S. Cl.
CPC ................ *B32B 27/08* (2013.01); *B32B 7/12* (2013.01); *B32B 27/304* (2013.01); *B32B 27/306* (2013.01); *B32B 27/32* (2013.01); *B32B 27/34* (2013.01); *B32B 27/36* (2013.01); *B65D 65/40* (2013.01); *B32B 2250/03* (2013.01); *B32B 2250/24* (2013.01); *B32B 2255/10* (2013.01); *B32B 2255/26* (2013.01); *B32B 2307/732* (2013.01); *B32B 2307/748* (2013.01); *B32B 2439/00* (2013.01); *B32B 2439/70* (2013.01)

(58) Field of Classification Search
CPC ........ B32B 27/08; B32B 27/32; B32B 27/325
See application file for complete search history.

(56) References Cited

U.S. PATENT DOCUMENTS

| | | | | |
|---|---|---|---|---|
| 6,068,936 | A | * | 5/2000 | Peiffer ........................ C08J 5/18 156/244.11 |
| 2006/0099436 | A1 | * | 5/2006 | Schwark ................. B32B 7/005 428/474.4 |

FOREIGN PATENT DOCUMENTS

| | | |
|---|---|---|
| JP | H04-047936 A | 2/1992 |
| JP | H09-248880 A | 9/1997 |
| JP | 2014004760 A * | 1/2014 |

OTHER PUBLICATIONS

Machine Translation of JP 2014-004760 (Year: 2014).*

* cited by examiner

*Primary Examiner* — Prashant J Khatri
*Assistant Examiner* — Zachary M Davis
(74) *Attorney, Agent, or Firm* — Osha Liang LLP

(57) ABSTRACT

A sealant film used by being laminated on a substrate includes a sealing layer including a first polyolefin resin and an antifogging agent and a first resin layer including 10% to 40% by mass of a cyclic polyolefin resin and 60% to 90% by mass of a second polyolefin resin, wherein the second polyolefin resin is not a cyclic polyolefin resin. The first resin layer is disposed on a surface of the sealing layer, and has a phase-separated structure in which the cyclic polyolefin resin is dispersed in the form of a layer in the second polyolefin resin.

16 Claims, No Drawings

SEALANT FILM AND LAMINATE FILM

TECHNICAL FIELD

One or more embodiments of the present invention relate to an antifogging sealant film used by being laminated on a substrate, and an antifogging laminate film including the sealant film laminated on a substrate.

BACKGROUND

In recent years, packaging materials used for packaging foods and the like have been required to have an antifogging property for enhancing visibility of contents such as fruits and vegetables, daily dishes, and the like. Examples of a method known as a method for imparting the antifogging property to packaging materials include a method of molding a resin into a film and then applying an antifogging agent on at least a surface in contact with contents (refer to, for example, Patent Literature 1), and a method of kneading an antifogging agent into a resin used for a packaging material, molding the resin into a film, and then performing secondary molding for various packaging materials (refer to, for example, Patent Literature 1).

CITATION LIST

Patent Literature

PTL 1: Japanese Unexamined Patent Application Publication No. 09-248880
PTL 2: Japanese Unexamined Patent Application Publication No. 04-047936

The method of applying a coating solution containing an antifogging agent on a film surface has a low production efficiency due to the need for a step of drying a coating film, and an antifogging effect may not persist because the antifogging agent on the coated surface is flowed due to evaporation of moisture from contents. On the other hand, in the method of kneading an antifogging agent into a resin, the antifogging effect may not be constant because the antifogging agent has the property of easily moving in a multilayer film and the effect has no persistence. When the persistence is regarded as important, the amount of the antifogging agent added is increased, thereby causing inhibition of sealability and the like.

SUMMARY

One or more embodiments of the present invention provide a sealant film and a laminate film which can persistently realize the antifogging property of preventing fogging.

Also, when a laminate film is formed by laminating a usual sealant film on a substrate through an adhesive layer, components of the adhesive may be eluted to the surface of a sealing surface. The elution of the adhesive components may not cope with the regulations of food packaging materials in Europe and may decrease the seal strength. Therefore, when the adhesive is used, it is desired to suppress the elution of adhesive components to the sealing surface.

One or more embodiments of the present invention provide a sealant film and a laminate film which can suppress the elution of adhesive components.

One or more embodiments of the present invention provide a sealant film as a sealant film used by being laminated on a substrate. The sealant film includes a sealing layer (A) containing a polyolefin resin (a1) ("first polyolefin resin") and an antifogging agent, and a resin layer (B) ("first resin layer") disposed on one of the surfaces of the sealing layer (A) and containing a cyclic polyolefin resin (b1) and a polyolefin resin (b2) other than a cyclic polyolefin resin ("second polyolefin resin"), wherein the content of the cyclic polyolefin resin (b1) contained in the resin layer (B) is 10% to 40% by mass, the content of the polyolefin resin (b2) other than a cyclic polyolefin resin is 60% to 90% by mass, and the resin layer (B) has a phase-separated structure in which the cyclic polyolefin resin (b1) is dispersed in the form of a layer in the polyolefin resin (b2) other than a cyclic polyolefin resin.

One or more embodiments of the present invention provide a sealant film as a sealant film used by being laminated on a substrate. The sealant film includes a sealing layer (A) containing a polyolefin resin (a1) and an antifogging agent, and a resin layer (B) disposed on one of the surfaces of the sealing layer (A) and containing a cyclic polyolefin resin (b1) and a polyolefin resin (b2) other than a cyclic polyolefin resin, wherein the content of the cyclic polyolefin resin (b1) contained in the resin layer (B) is 10% to 40% by mass, the content of the polyolefin resin (b2) other than a cyclic polyolefin resin is 60% to 90% by mass, the melt flow rate (230° C., 21.18 N) of the cyclic polyolefin resin (b1) is 5 to 20 g/10 min, and the melt flow rate (230° C., 21.18 N) of the polyolefin resin (b2) other than a cyclic polyolefin resin is 0.5 to 4.0 g/10 min.

A sealant film according to one or more embodiments of the present invention includes a resin layer containing a cyclic polyolefin resin and provided on one of the surfaces of a sealing layer containing an antifogging agent, and thus migration of the antifogging agent between layers can be suppressed, and the antifogging property can be persistently exhibited. Also, when a substrate is laminated through an adhesive, the elution of components of the adhesive to the surface of the sealing layer can be suppressed, and good sealability can be maintained.

Further, the resin layer (B) has a configuration in which a polyolefin resin other than a cyclic polyolefin resin is used as a matrix material and a cyclic polyolefin resin is dispersed in the polyolefin resin, and thus flexibility and adhesion between layers can be easily obtained.

DETAILED DESCRIPTION OF THE EMBODIMENTS

A sealant film according to one or more embodiments of the present invention is a sealant film used by being laminated on a stretched substrate or the like. The sealant film includes a sealing layer (A) containing a polyolefin resin (a1) ("first polyolefin resin") and an antifogging agent, and a resin layer (B) ("first resin layer") disposed on one of the surfaces of the sealing layer (A) and containing a cyclic polyolefin resin (b1), the content of the cyclic polyolefin resin (b1) contained in the resin layer (B) being 10% to 40% by mass, and the content of a polyolefin resin (b2) other than a cyclic polyolefin resin ("second polyolefin resin") being 60% to 90% by mass. The resin layer (B) has a phase-separated structure in which the cyclic polyolefin resin (b1) is dispersed in the form of a layer in the polyolefin resin (b2) other than a cyclic polyolefin resin.

[Sealing Layer (A)]

The sealing layer (A) used in the sealant film of one or more embodiments of the present invention is a layer containing the polyolefin resin (a1) and the antifogging agent, and is a layer to be welded with another sealing layer or with an adherend object by heating or the like. The sealing layer (A) may be a sealing layer including a single layer or a plurality of laminated layers each containing the polyolefin resin (a1) and the antifogging agent.

Examples of the polyolefin resin (a1) used in the sealing layer (A) include polyethylene resins such as low-density polyethylene (LDPE), linear low-density polyethylene (LLDPE), very low-density polyethylene (VLDPE), medium-density polyethylene (MLDPE), high-density polyethylene (HDPE), and the like; ethylene copolymers such as ethylene-vinyl acetate copolymer (EVA), ethylene-methyl methacrylate copolymer (EMMA), ethylene-ethyl acrylate copolymer (EEA), ethylene-methyl acrylate (EMA) copolymer, ethylene-ethyl acrylate-maleic anhydride copolymer (E-EA-MAH), ethylene-acrylic acid copolymer (EAA), ethylene-methacrylic acid copolymer (EMAA), and the like; ethylene-acrylic acid copolymer ionomer, ethylene-methacrylic acid copolymer ionomer, polypropylene resin, and the like. These may be used alone or as a mixture of two or more.

Among these, polyolefin resins not having a cyclic structure may be used, and polyethylene resins such as low-density polyethylene (LDPE), linear low-density polyethylene (LLDPE), very low-density polyethylene (VLDPE), medium-density polyethylene (MLDPE), and the like may be used for enhancing film formation stability in co-extrusion with the resin layer (B) having a cyclic polyolefin resin because of high adhesion to the resin layer (B).

LDPE may be any branched low-density polyethylene produced by a high-pressure radical polymerization method, and may be a branched low-density polyethylene produced by a high-pressure radical polymerization method for homopolymerization of ethylene.

LLDPE which can be used is produced by a low-pressure radical polymerization method using a single-site catalyst for copolymerizing an ethylene monomer as a main component with α-olefin as a comonomer, such as butene-1, hexene-1, octene-1, 4-methylpentene, or the like. The comonomer content in LLDPE may be within a range of 0.5 to 20 mol % or within a range of 1 to 18 mol %.

Examples of the single-site catalyst include various single-site catalysts such as a metallocene catalyst system including a metallocene compound of a group IV or group V transition metal in the periodic table combined with an organic aluminum compound and/or ionic compound, and the like. The single-site catalyst produces a resin having a sharp molecular weight distribution due to uniform active points as compared with a multi-site catalyst having non-uniform active points, and thus may produce a resin which when formed into a film, has little deposition of a low-molecular-weight component and excellent physical properties such as seal strength stability and blocking resistance.

The density of the ethylene resin may be within a range of 0.880 to 0.970 $g/cm^3$ or within a range of 0.900 to 0.965 $g/cm^3$. With the density within the range, the ethylene resin has appropriate rigidity and excellent mechanical strength such as heat-seal strength, pinhole resistance, etc., and film formability and extrusion properties are improved. Also, in general, the melting point may be within a range of 60° C. to 130° C. or 70° C. to 120° C. With the melting point within the range, processing stability and co-extrusion processability with the layer (B) are improved, and flexibility is further exhibited, thereby causing good pinhole resistance. Also, MFR (190° C., 21.18 N) of the ethylene resin may be 2 to 20 g/10 min or 3 to 10 g/10 min With MFR within the range, extrusion moldability of a film is improved.

Examples of the propylene resin include a propylene homopolymer, propylene-α-olefin random copolymers, for example, propylene-ethylene copolymer, propylene-butene-1 copolymer, and propylene-ethylene-butene-1 copolymer, metallocene catalyst-system polypropylene, and the like. These may be used alone or in combination. Among these, propylene-α-olefin random copolymers may be used, such as propylene-α-olefin random copolymers produced by polymerization using a metallocene catalyst.

Further, the polypropylene resin may have a MFR (230° C.) of 0.5 to 30.0 g/10 min and a melting point of 110° C. to 165° C., or a MFR (230° C.) of 2.0 to 15.0 g/10 min and a melting point of 115° C. to 162° C. With MFR and melting point within these respective ranges, the resultant film has good dimensional stability and, further when a film is formed, film formability is improved.

The content of the polyolefin resin (a1) in the sealing layer (A) used in one or more embodiments of the present invention is not particularly limited, but a main component in the resin components contained in the sealing layer (A) may contain the polyolefin resin (a1) as a main component, and the resin components may contain 90% by mass or more or 95% by mass or more of the polyolefin resin (a1) and may substantially contain the polyolefin resin. Various resins which can be co-extruded with the polyolefin resin can be used as resin components other than the polyolefin resin.

The antifogging agent used in the sealing layer (A) is not particularly limited as long as it is generally known as being added to an olefin resin to impart the antifogging property and, for example, an anionic surfactant, a nonionic surfactant, a cationic surfactant, an amphoteric surfactant, or the like can be used. In particular, a nonionic surfactant may be used.

Examples thereof include sorbitan-based surfactants such as sorbitan monostearate, sorbitan distearate, sorbitan monopalmitate, sorbitan dipalmitate, sorbitan monobehenate, sorbitan dibehenate, sorbitan monolaurate, sorbitan dilaurate, and the like; glycerin-based surfactants such as glycerin monolaurate, glycerin dilaurate, diglycerin monopalmitate, diglycerin dipalmitate, glycerin monostearate, glycerin distearate, diglycerin monostearate, diglycerin distearate, diglycerin monolaurate, diglycerin dilaurate, and the like; polyethylene glycol-based surfactants such as polyethylene glycol monostearate, polyethylene glycol monopalmitate, and the like; trimethylolpropane-based surfactants such as trimethylolpropane monostearate and the like; diethanol alkylamine-based and diethanol alkylamide-based surfactants such as lauryl diethanolamine, oleyl diethanolamine, stearyl diethanolamine, lauryl diethanolamide, oleyl diethanolamine, stearyl diethanolamide, and the like; pentaerythritol-based surfactants such as pentaerythritol monopalmitate and the like; polyoxyethylene sorbitan monostearate, polyoxyethylene sorbitan distearate, sorbitan-diglycerin condensate mono- and distearates; and the like. These can be used alone or in combination of two or more.

The content of the antifogging agent in the sealing layer (A) may be within a range of 0.2% to 5% by mass, within a range of 0.3% to 4% by mass, or within a range of 0.4% to 3.5% by mass relative to the total mass of the layer. With the antifogging agent content within the range, the antifogging property can be easily obtained, and a decrease in transparency due to bleeding of the antifogging agent to the surface of the sealing layer (A) can be easily suppressed. Further, inhibition of the sealability and decrease in seal strength can be easily suppressed.

[Resin Layer (B)]

The resin layer (B) used in one or more embodiments of the present invention is a resin layer including containing the cyclic polyolefin resin (b1) and the polyolefin resin (b2) other than a cyclic polyolefin resin, and is provided on one of the sides of the sealing layer (A) containing the antifogging agent. Since the resin layer (B) is provided on one of the sides of the sealing layer (A), migration of the antifogging agent between layers can be suppressed, and the antifogging property can be persistently exhibited. Also, when laminated on another substrate through an adhesive, migration of adhesive components can be suppressed. The resin layer (B) may be provided on the side other than the sealing surface of the sealing layer (A) and another layer may be provided between the sealing layer (A) and the resin layer (B), but the resin layer (B) may be directly laminated.

The structure of the cyclic polyolefin resin (b1) used in the resin layer (B) is not particularly limited, and examples thereof include a norbornene-based polymer, a vinyl alicyclic hydrocarbon polymer, a cyclic conjugated diene polymer, and the like. Among these, the norbornene-based polymer may be used. Examples of the norbornene-based polymer include ring-opened polymers (referred to as "COP" hereinafter) of norbornene-based monomers, norbornene-based copolymers (referred to as "COC" hereinafter) produced by copolymerization of norbornene-based monomers with an olefin such as ethylene or the like, and the like. Further, hydrogenated products of COP and COC may be used. In addition, the weight-average molecular weight of a cyclic olefin resin may range from 5,000 to 500,000 or from 7,000 to 300,000.

A norbornene-based monomer used as a raw material of the norbornene-based polymer is an alicyclic monomer having a norbornene ring. Examples of the norbornene-based monomer include norbornene, tetracyclododecene, ethylidene norbornene, vinyl norbornene, ethylidene tetracyclododecene, dicyclopentadiene, dimetanotetrahydrofluorene, phenyl norbornene, methoxycarbonyl norbornene, methoxycarbonyl tetracyclododecene, and the like. These norbornene-based monomers may be used alone or in combination of two or more.

Examples of an olefin used for norbornene-based copolymers produced by copolymerizing the norbornene-based monomers with a copolymerizable olefin include olefins having 2 to 20 carbon atoms, such as ethylene, propylene, 1-butene, and the like; cycloolefins such as cyclobutene, cyclopentene, cyclohexene, and the like; non-conjugated dienes such as 1,4-hexadiene and the like. These olefins can be used alone or in combination of two or more.

Examples of commercial products of the norbornene-based monomer ring-opened polymers (COP) which can be used as the cyclic polyolefin resin include "ZEONOR" manufactured by Zeon Corporation and the like, and examples of the norbornene-based copolymers (COC) include "APEL" manufactured by Mitsui Chemicals, Inc., "TOPAS" manufactured by Polyplastics Co., Ltd., and the like.

When 40% by mass or less of a cyclic polyolefin resin having a glass transition temperature of 160° C. or less, among these cyclic polyolefin resins, is used in the resin layer (B) used in one or more embodiments of the present invention, low adsorption, bag breakage resistance, and seal strength can be easily provided at the same time. When 40% by mass or less of a cyclic polyolefin resin having a glass transition temperature of 130° C. or less is contained, interlayer strength with the resin layer (A) is improved, and thus high seal strength can be easily obtained.

For example, an amorphous cyclic polyolefin resin having a norbornene-based monomer content of 75% by mass or less can be used as the cyclic polyolefin resin having a glass transition temperature of 130° C. or less, and a cyclic polyolefin resin having the monomer content of 70% by mass or less may also be used.

In one or more embodiments of the present invention, usable examples of the polyolefin resin (b2) other than a cyclic polyolefin resin (may be referred to as the polyolefin resin (b2) hereinafter) used in the resin layer (B) include the resins exemplified as the polyolefin resin (a1) used in the sealing layer (A), and these may be used alone or in combination of a plurality of resins.

In particular, the polyethylene resin and propylene resin may be used. The propylene resin may be a propylene homopolymer or a copolymer with another olefin, and examples thereof include a propylene homopolymer, propylene-α-olefin random copolymers, for example, a propylene-ethylene copolymer, a propylene-butene-1 copolymer, a propylene-ethylene-butene-1 copolymer, a metallocene catalyst system polypropylene, and the like. These may be used alone or in combination. The propylene-α-olefin random copolymers may be used, such as a propylene-α-olefin random copolymer produced by polymerization using a metallocene catalyst. When the propylene resin is used, the heat resistance of a film can be improved, and the softening temperature can be increased, and thus the film can be used as a packaging material excellent in boiling or hot filling at 100° C. or less or steam-high-pressure heating sterilization characteristics such as retort sterilization at 100° C. or more and the like.

The resin layer (B) used in one or more embodiments of the present invention may have a cyclic polyolefin resin (b1) content of 10% to 40% by mass and a polyolefin resin (b2) content of 60% to 90% by mass in the resin components contained in the resin layer (B). The resin layer (B) has a configuration in which a polyolefin resin other than a cyclic polyolefin resin is used as a matrix material, and the cyclic polyolefin resin (b1) is dispersed in the polyolefin resin (b2), and thus flexibility and adhesion between layers can be easily obtained. When the resin layer (B) has a phase-separated structure in which the cyclic polyolefin resin (b1) is dispersed in the form of a layer in the polyolefin resin (b2), the antifogging property can be easily realized. Also, the antifogging property can be realized by using a small amount of the cyclic polyolefin resin, and thus the cost can be decreased. Further, improvement in adhesion to other layers such as the resin layer (A) and the like, adjustment of rigidity, and impartation of flexibility can be achieved.

The content of the cyclic polyolefin resin (b1) in the resin components contained in the resin layer (B) may be 10% to 30% by mass or 20% to 30% by mass. The content of the polyolefin resin (b2) other than a cyclic polyolefin resin may range from 70% to 90% by mass or from 70% to 80% by mass. Within each of these ranges, the phase-separated structure can be easily realized, in which the cyclic polyolefin resin (b1) is dispersed in the form of a layer in the polyolefin resin (b2).

In addition, for the purpose of improving adhesion to other layers, adjusting rigidity, imparting flexibility, decreasing the cost, and the like, a resin other than the cyclic polyolefin resin (b1) and the polyolefin resin (b2) may be properly used in the resin layer (B) used in one or more embodiments of the present invention. When another resin component is used simultaneously, the content may be 20% by mass or less or 10% by mass or less in the resin components of the resin layer (B).

In one or more embodiments of the present invention, the polyolefin resin (b2) having a lower melt flow rate value than that of the polyolefin resin (b1) may be used as the polyolefin resin (b2). By using the polyolefin resin (b2)

having a lower melt flow rate value than that of the cyclic polyolefin resin (b1), the phase-separated structure can be easily realized, in which the cyclic polyolefin resin (b1) is dispersed in the form of a layer in the polyolefin resin (b2), and migration and movement of the antifogging agent in the film can be effectively suppressed.

The melt flow index MFR (230° C., 21.18 N) of the cyclic polyolefin resin (b1) may be 5 to 20 g/10 min or 5 to 10 g/min because the phase-separated structure can be easily formed. The intended phase-separated structure can be easily exhibited by using the norbornene-based polymer having such MFR in combination with the polyolefin resin (b2).

The melt flow rate MFR (230° C., 21.18 N) of the polyolefin resin (b2) used in combination with the cyclic olefin resin (b1) may range from 0.5 to 4.0 g/10 min. A difference in MFR from the cyclic olefin resin (b1) may be 3 g/10 min or more because the intended layered structure can be easily exhibited. The spontaneous phase-separated structure can be easily exhibited by providing a difference in MFR between both resins.

The glass transition temperature Tg of the cyclic polyolefin resin (b1) may range from 70° C. to 160° C. because the layered phase-separated structure can be spontaneously easily formed in combination with the polyolefin resin (b2), or may be 130° C. or less from the viewpoint that the intended phase-separated structure can be easily formed. In one or more embodiments of the present invention, the glass transition temperature Tg is a value obtained by DSC measurements.

Also, the melting point of the polyolefin resin (b2) may range from 110° C. to 165° C., or from 115° C. to 162° C. The melting point within the range makes it easy to improve the film formability of a film.

The resin layer (B) in which the cyclic polyolefin resin (b1) and the polyolefin resin (b2) form the layered phase-separated structure can be confirmed by observing a section of a film in the state of a sealant film or laminate film with a scanning transmission electron microscope. When the cyclic polyolefin resin (b1) is dispersed in the form of a layer in the polyolefin resin (b2), the thickness of one of the layers is about 20 to 100 nm. A laminate of a plurality of such very thin layers can suppress antifogging agent migration and adhesive elution can.

[Sealant Film]

In one or more embodiments of the present invention, the sealant film includes the sealing layer (A) containing the polyolefin resin (a1) and the antifogging agent and the resin layer (B) provided on one of the sides of the sealing layer (A) and containing the cyclic polyolefin resin (b1). The configuration can suppress interlayer migration of the antifogging agent and persistently exhibit the antifogging property.

In one or more embodiments of the present invention, the sealant film may include multiple other layers provided on the resin layer (B). An example of the other layers is a resin layer (C) ("second resin layer") containing a polyolefin resin as a main component. The polyolefin resin used in the sealing layer (A) may be used as the polyolefin resin, and a polyethylene resin such as very low-density polyethylene (VLDPE), linear low-density polyethylene (LLDPE), low-density polyethylene (LDPE), medium-density polyethylene (MLDPE), or the like can be used.

The content of the polyolefin resin in the resin layer (C) may be 50% by mass or more or 60% by mass or more relative to the total mass of resin components used for forming the resin layer (C). The resin layer (C) may further contain another component other than the polyolefin resin, and various resins coextrudable with the polyolefin resin can be used as the other component.

In one or more embodiments of the present invention, the sealant film can be used by properly laminating various layers as long as it includes at least the sealing layer (A) and the resin layer (B) in a (A)/(B) configuration. The configurations of (A)/(B)/(C), (A)/(B)/(C)/(B), and the like can be exemplified as the configuration using the resin layer (C) because seal strength and excellent low adsorption can be easily achieved, and dimensional stability and film formability can be easily improved.

In one or more embodiments of the present invention, the thickness of the sealant film may be within a range of 15 to 200 μm or within a range of 30 to 150 μm from the viewpoint of balance between rigidity and the antifogging property, sealability, and processability.

In one or more embodiments of the present invention, the thickness of the sealing layer (A) in the sealant film may be 50 μm or less or 30 μm or less. With the resin layer (A) having a thickness of 50 μm, high seal strength and the antifogging property can be easily obtained.

In one or more embodiments of the present invention, the thickness of the resin layer (B) in the sealant film may be 50 μm or less or 30 μm or less. With the resin layer (B) having a thickness of 50 μm or less, the antifogging property after lamination and high seal strength can be easily obtained.

Also, when the resin layer (C) is used, the thickness of the resin layer (C) may be 150 μm or less or 100 μm or less because the effect of use of the resin layer (C), such as lamination suitability and the like, can be easily obtained.

In addition, each of the layers in the sealant film may include a plurality of same layers, and when a plurality of same layers are provided, the total thickness of the layers may be within the range described above. The lower limit of the thickness of each of the layers is not particularly limited, but the thickness of each of the layers may be 3 μm or more or 5 μm or more.

In the three-layer configuration of (A)/(B)/(C), the ratio of the thickness of the sealing layer (A) to the total thickness may be 10% to 40% or 10% to 30% because sealability, processability etc. can be easily obtained. The ratio of the thickness of the resin layer (B) to the total thickness may be 10% to 60% or 10% to 50%.

If required, components such as an antistatic agent, a thermal stabilizer, a nucleating agent, an antioxidant, a lubricant, an anti-blocking agent, a mold release agent, an ultraviolet absorber, a coloring agent, etc. can be added to each of the resin layers (A), (B), and (C), and generally within a range of 2 parts by mass or less relative to 100 parts by mass of the resin components used in each of the layers. In particular, the surface friction coefficient of the sealant film may be 1.5 or less or 1.0 or less in order to impart processability of film molding and packaging suitability of a filling machine. Therefore, a lubricant and an anti-blocking agent may be added to the resin layer corresponding to the surface layer in the sealant film.

In addition, the surface (one and/or both of the surfaces) of the resin layer serving as the surface layer in the sealant film used in one or more embodiments of the present invention may be treated to have a surface tension of 35 to 45 mN/m. Examples of such a treatment method include surface oxidation treatments such as corona treatment, plasma treatment, chromic acid treatment, flame treatment, hot-air treatment, ozone-ultraviolet light treatment, and the like; surface roughening treatment such as sand blasting and the like, and corona treatment may be used. Such surface treatment improves coatability of an ink or an adhesive when the sealant film is subjected to a post-process such as printing, adhesive application, or the like, and thus excellent adhesion to an ink, an adhesive, and the like is exhibited, thereby easily avoiding omission, delamination, or the like.

A method for producing the sealant film used in one or more embodiments of the present invention is not particularly limited, but is, for example, a co-extrusion method in which the resins or resin mixtures used for the respective layers are heat-molten in separate extruders, laminated in a melt state by a method such as a co-extrusion multilayer die method, a feed block method, or the like, and then molded into a film by an inflation or T-die-chill roll method, or the like. The co-extrusion method may be used because the method is capable of relatively freely adjusting the thickness ratio of each of the layers, has excellent sanitation, and can produce a film with excellent cost performance. When an ethylene-based resin is used on both outer surface layers of the layer (B) containing the cyclic olefin resin used in one or more embodiments of the present invention, large differences in melting point and Tg between both resins may cause deterioration in appearance of the film during co-extrusion and cause difficulty in forming a uniform layer configuration. In order to suppress such deterioration, the T-die-chill roll method capable of melt extrusion at a relatively high temperature may be used.

When a multilayer air-cooling inflation method is used as the method for producing the sealant film, an apparatus which is generally used in the market may be used. A general air-cooling inflation apparatus includes an extruder, a circular die, a cooling ring, a blower, a guide plate, a pinch roll, a corona-treatment device, a winding device, etc., and a multilayer inflation apparatus is provided with a plurality of extruders and a spiral multilayer die. The production conditions for the multilayer inflation method are not particularly limited, but it is possible to use a resin having the characteristic of being capable of maintaining bubble stability when extruded from the circular die. When layers are formed on both surfaces of the layer (B), the same ethylene resins or propylene resins as the olefin resins described above can be used, but a resin having specified MFR may be used in view of bubble stability. The ethylene resin may have a MFR (190° C., 21.18 N) of 0.1 to 5 g/10 min or 0.5 to 4 g/10 min. The propylene resin may have a MFR (230° C., 21.18 N) of 0.1 to 5 g/10 min or 0.5 to 4 g/10 min. When the resin used in both surface layers has a MFR within the range, bubbles are stabilized and extrusion moldability is improved even by directly using a resin having the characteristics described above as the cyclic olefin resin (a1).

Also, when high heat-seal strength, hot-tackiness, high packaging speed are required, after layers in a multilayer configuration such as a three-layer configuration are laminated by the co-extrusion lamination method, a special heat-sealable resin satisfying the performance described above may be applied on the surface opposite to the side bonded to a substrate, a heat-sealing layer may be formed by laminating a film having a special heat-sealable resin, or a heat-sealing layer may be formed by extrusion-laminating a film having a special heat-sealable resin.

[Laminate Film]

In one or more embodiments of the present invention, the sealant film is laminated on another substrate disposed on the surface other than the sealing layer surface and is used as a laminate film. The substrate is not particularly limited, but a plastic substrate, such as a biaxially stretched resin film, may be used from the viewpoint of easily exhibiting the effect of one or more embodiments of the present invention. In an application not requiring transparency, an aluminum foil and a plastic substrate on which aluminum is deposited can be used alone or in combination.

Examples of the stretched resin film include biaxially stretched polyester (PET), biaxially stretched polypropylene (OPP), biaxially stretched polyamide (PA), co-extruded biaxially stretched polypropylene containing ethylene-vinyl alcohol copolymer (EVOH) as a center layer, biaxially stretched ethylene-vinyl alcohol copolymer (EVOH), co-extruded biaxially stretched polypropylene coated with polyvinylidene chloride (PVDC), and the like. These may be used alone or as a composite.

In one or more embodiments of the present invention, the laminate film is a film produced by laminating the substrate and the sealant film produced by the production method described above. Lamination is performed by a lamination method, for example, dry lamination, wet lamination, non-solvent lamination, extrusion lamination, or the like, through an adhesive layer.

Examples of an adhesive used for the dry lamination include a polyether-polyurethane-based adhesive, a polyester-polyurethane-based adhesive, and the like. Although various adhesives can be used, a pressure-sensitive adhesive may be used. Examples of the pressure-sensitive adhesive include a rubber-based adhesive prepared by dissolving polyisobutylene rubber, butyl rubber, or a mixture thereof in an organic solvent such as benzene, toluene, xylene, or hexane; an adhesive containing a tackifier such as rosin abietate, terpene-phenol copolymer, terpene-indene copolymer, or the like added to the rubber-based adhesive; an acrylic adhesive prepared by dissolving an acrylic copolymer having a glass transition temperature of −20° C. or less, such as 2-ethylhexyl acrylate-acrylic acid-n-butyl copolymer, 2-ethylhexyl acrylate-ethyl acrylate-methyl methacrylate copolymer, or the like in an organic solvent; and the like.

The adhesive for laminate is generally cured by polyol/isocyanate and is often used for high-performance applications such as retort application and the like. In addition, a combination of lamination materials generally includes an aluminum foil and the sealant film. However, various transparent vapor-deposition films having both a barrier property and transparency become commercially available due to the appearance of a transparent vapor deposition technique. In addition, improvement in visibility of contents is required, and thus a laminate of a transparent vapor-deposition film and a sealant film is often used.

Therefore, in order to impart adhesion between the sealant film and the vapor deposition film, a silane coupling agent such as epoxysilane, aminosilane silane, or the like is generally added to the adhesive.

However, when the amount of epoxysilane is increased for maintaining adhesion, the elution of epoxysilane to food is increased. Further, when the same adhesive is used for laminating a film formed without vapor deposition, the elution of the silane coupling agent is more increased than in a configuration involving vapor deposition, thereby causing the need for exchange the adhesive according to the configuration.

Examples of a polyol used for the adhesive for laminate include polyols described below, polyester polyols produced by reacting polyol with polycarboxylic acids described below, polyethers produced by addition polymerization of monomers such as ethylene oxide, propylene oxide, butylene oxide, styrene oxide, epichlorohydrin, tetrahydrofuran, cyclohexylene, and the like using as an initiator a compound having two active hydrogen atoms, such as ethylene glycol, diethylene glycol, triethylene glycol, propylene glycol, trimethylene glycol, 1,3-butanediol, 1,4-butanediol, 1,6-hexanediol, neopentyl glycol, or the like, and the like.

Examples of the polyol include glycols such as ethylene glycol, propylene glycol, 1,3-propanediol, 1,4-butanediol, 1,5-pentanediol, 3-methyl-1,5-pentanediol, 1,6-hexanediol, neopentyl glycol, methylpentanediol, dimethylbutanediol, butylethylpropanediol, diethylene glycol, triethylene glycol, tetraethylene glycol, dipropylene glycol, tripropylene glycol, bishydroxyethoxybenzene, 1,4-cyclohexanediol, 1,4-cyclohexanedimethanol, triethylene glycol, polycaprolactonediol, dimer diol, bisphenol A, hydrogenated bisphenol A, and the like; polyesters produced by ring-opening polymerization reaction of cyclic ester compounds such as propiolactone, butyrolactone, ε-caprolactone, δ-valerolactone, β-methyl-δ-valerolactone, and the like; polyethers produced by addition polymerization of monomers such as ethylene oxide, propylene oxide, butylene oxide, styrene oxide, epichlorohydrin, tetrahydrofuran, cyclohexylene, and the like using as an initiator a compound having two active hydrogens such as ethylene glycol, diethylene glycol, triethylene glycol, propylene glycol, trimethylene glycol, 1,3-butanediol, 1,4-butanediol, 1,6-hexanediol, neopentyl glycol, or the like.

Examples of the polycarboxylic acids include polybasic acids such as succinic acid, adipic acid, azelaic acid, sebacic acid, dodecanedicarboxylic acid, maleic anhydride, fumaric acid, 1,3-cyclopentanedicarboxylic acid, 1,4-cyclohexanedicarboylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bis(phenoxy)ethane-p,p'-dicarboxylic acid, and anhydrides or ester-forming derivatives of these dicarboxylic acids; p-hydroxybenzoic acid, p-(2-hydroxyethoxy)benzoic acid, and ester-forming derivatives of these dihydroxycarboxylic acids; dimer acid; and the like.

The polyisocyanate is, for example, an organic compound having at least two isocyanate groups in its molecule. Examples of an organic polyisocyanate include polyisocyanates such as tolylene diisocyanate, xylylene diisocyanate, diphenylmethane diisocyanate, 1,6-hexamethylene diisocyanate, isophorone diisocyanate, 4,4'-methylene bis(cyclohexylisocyanate), lysine diisocyanate, trimethylhexamethylene diisocyanate, 1,3-(isocyanatomethyl)cyclohexane, 1,5-naphthalene diisocyanate, triphenylmethane triisocyanate, and the like; derivatives (modified products) of polyisocyanates, such as adducts of these polyisocyanates, burets of these polyisocyanates, and isocyanurates of these polyisocyanates; and the like.

Also, a reaction product of the isocyanate and the polyol, which is produced with an excessive amount of isocyanate group, may be used.

The equivalent ratio of polyol/isocyanate (the ratio of an equivalent amount of the hydroxyl group of the polyol to an equivalent amount of the isocyanate of the polyisocyanate) may be 0.5 to 5.0.

Examples of the epoxysilane include methacrylsilane-based silane coupling agents such as 3-methacryloxypropyl trimethoxysilane, 3-methacryloxypropyl triethoxysilane, and the like; 3-glycidoxypropyl trimethoxysilane, 3-glycidoxypropyl triethoxysilane, 2-(3,4-epoxycyclohexyl)ethyl trimethoxysilane, and the like.

Referring now to European regulations, in Switzerland, elution regulations on ink and coating agents out of contact with foods are legislated as Swiss Ordinance SR817. 023. 21 and currently become only one positive list (PL) of materials out of contact with foods in the world. In the PL, materials are classified based on whether or not toxicity data is known. Specific Migration Limit (SML) of each of the materials is provided. The epoxysilane is classified as having unknown toxicity data, and SML is less than 10 μg/kg-food.

The laminate film of one or more embodiments of the present invention can be used as various packaging materials. Examples of packaging materials include packaging bags used for applications such as foods, medicines, cosmetics, sanitary goods, industrial parts, miscellaneous goods, magazines, and the like, containers, cover materials of containers, and the like. In particular, from the viewpoint that the laminate film has the good antifogging property and elution from the adhesive layer to contents can be effectively suppressed, the laminate film can be used for foods, medical products, and the like in which visibility is required for making contents visible.

The packaging bag may be a packaging bag formed by laminating the inner surfaces (sealing layers) of the laminate films of one or more embodiments of the present invention and heat-sealing together the inner surfaces or by laminating the inner surface and the substrate and heat-sealing the inner surface and the substrate so that the inner surface is on the inside. For example, two laminate films are cut into the size of a desired packaging bag, laminated, and then heat-sealed at three sides to form a bag shape, and then the bag is filled with a content from the side not heat-sealed and sealed by heat sealing, thereby permitting use as a packaging bag. A packaging bag can also be formed by sealing the ends of a rolled film in a cylindrical (pillow) shape and then sealing the upper and low ends using an automatic packaging machine.

Also, a packaging bag, a container, or a container cover can be formed by heat-sealing the inner layer with another film, sheet, or container which is heat-sealable with the inner layer. In this case, a polyethylene, polypropylene, EVA, PET film or sheet or the like, which has a relatively large thickness, can be used as the other film.

In order to improve openability by weaken the initial tear strength, any desired tear starting portion such as a V-notch, an I-notch, a perforation, micropores, or the like may be formed in a packaging material using the laminate film of one or more embodiments of the present invention.

EXAMPLES

Preparation Example 1

[Preparation of Antifogging Agent Master Batch Containing Propylene-Ethylene Copolymer as Base]

A propylene-ethylene copolymer (MFR (230° C.) 7 g/10 min, melting point 130° C.) and nonionic surfactant Rikemal O-71-D manufactured by Riken Vitamin Co., Ltd. were mixed at a mass ratio of 90/10, and the resultant mixture was melt-kneaded by an extruder and then granulated by a granulator to form antifogging agent master batch pellets (referred to as an "antifogging agent (1)" hereinafter).

Preparation Example 2

[Preparation of Antifogging Agent Master Batch Containing Linear Polyethylene as Base]

A linear polyethylene (MFR (190° C.) 4 g/10 min, density 0.905 g/cm$^3$) and nonionic surfactant Rikemal O-71-D manufactured by Riken Vitamin Co., Ltd. were mixed at a mass ratio of 80/20, and the resultant mixture was melt-kneaded by an extruder and then granulated by a granulator to form antifogging agent master batch pellets (referred to as an "antifogging agent (2)" hereinafter).

Preparation Example 3

[Preparation of Antifogging Agent Master Batch Containing Propylene-Ethylene Copolymer as Base]

A propylene-ethylene copolymer (MFR (230° C.) 7 g/10 min, melting point 130° C.) and nonionic surfactant Rikemal O-71-D manufactured by Riken Vitamin Co., Ltd. were mixed at a mass ratio of 80/20, and the resultant mixture was melt-kneaded by an extruder and then granulated by a granulator to form antifogging agent master batch pellets (referred to as an "antifogging agent (3)" hereinafter).

Preparation Example 4

[Preparation of Antifogging Agent Master Batch Containing Propylene-Ethylene Copolymer as Base]

A propylene-ethylene copolymer (MFR (230° C.) 7 g/10 min, melting point 130° C.) and nonionic surfactant Poem DL-100 manufactured by Riken Vitamin Co., Ltd. were mixed at a mass ratio of 90/10, and the resultant mixture was melt-kneaded by an extruder and then granulated by a granulator to form antifogging agent master batch pellets (referred to as an "antifogging agent (4)" hereinafter).

Example 1

A resin mixture of 70 parts by mass of propylene-ethylene copolymer (COPP (1)) having a melting point of 140° C. and a MFR of 3.5 g/10 min (230° C., 21.18 N) and 30 parts by mass of a norbornene-based monomer ring-opened polymer (COC (1)) having a glass transition temperature (Tg) of 78° C. and a MFR of 10 g/10 min (230° C., 21.18 N) was used as a resin for a cyclic polyolefin resin layer (B). Also, a mixture of 80 parts by mass of a propylene-α-olefin random copolymer (MRCPP (1)) (density: 0.900 g/cm$^3$, melting point: 125° C., MFR: 4 g/10 min (230° C., 21.18 N)) polymerized by using a metallocene catalyst and 20 parts by mass of the antifogging agent (1) was used as a resin for a sealing layer (A).

The resins were supplied to an extruder (aperture 50 mm) for the cyclic polyolefin resin layer (B) and an extruder (aperture 50 mm) for the sealing layer (A), respectively, and molten at 200° C. to 250° C. The molten resins were supplied to a co-extrusion multilayer film producing apparatus having a feed block (temperature of feed block and T-die: 250° C.) by a T-die-chill roll method and co-melt-extruded to form a film having, as a layer configuration, a two-layer configuration of cyclic polyolefin resin layer (B)/sealing layer (A), which was then cooled by a water-cooled metal cooling roll of 40° C. As a result, a sealant film having a total thickness of 30 μm and a thickness ratio of 6/24 μm was produced. Next, the resin layer (B) was subjected to corona treatment so as to have a wetting tension of 40 mN/m.

The dispersion state of the resultant sealant film was observed by STEM observation of sections in a direction vertical to the flow direction and in a horizontal direction. As a result, a layered phase-separated structure was confirmed in the sections in both the vertical direction and the horizontal direction. The resultant sealant film was laminated with a biaxially stretched polyester film of 12 μm through a polyurethane-based adhesive [DIC DRY LX510/KR90 manufactured by DIC Corporation] to produce a laminate film.

Example 2

A resin mixture of 70 parts by mass of a propylene-α-olefin random copolymer (MRCPP (2)) (density: 0.900 g/cm$^3$, melting point: 140° C., MFR: 2 g/10 min (230° C., 21.18 N)) polymerized by using a metallocene catalyst and 30 parts by mass of COC (1) was used as a resin for a cyclic polyolefin resin layer (B). Also, the MRCPP (1) was used as a resin for a resin layer (C). A mixture of 80 parts by mass of MRCPP (1) and 20 parts by mass of the antifogging agent (1) was used as a resin for a sealing layer (A).

As in Example 1, the resins were supplied to an extruder (aperture 50 mm) for the cyclic polyolefin resin layer (B), an extruder (aperture 50 mm) for the sealing layer (A), and an extruder (aperture 50 mm) for the resin layer (C), respectively, and molten at 200° C. to 250° C. The molten resins were supplied to a co-extrusion multilayer film producing apparatus having a feed block (temperature of feed block and T-die: 250° C.) by a T-die-chill roll method and co-melt-extruded to form a sealant film having a total thickness of 30 μm and a thickness ratio of resin layer (C)/cyclic polyolefin resin layer (B)/sealing layer (A) of 18/3/9 μm was produced. Next, the resin layer (C) was subjected to corona treatment so as to have a wetting tension of 40 mN/m. The dispersion state of the resultant film was observed by STEM observation of sections in a direction vertical to the flow direction and in a horizontal direction. As a result, a layered phase-separated structure was confirmed in the sections in both the vertical direction and the horizontal direction. The resultant was used for producing a laminate film by lamination through an adhesive according to the same method as in Example 1.

Example 3

A resin mixture of 70 parts by mass of linear medium-density polyethylene (MLDPE (1)) [density: 0.935 g/cm$^3$, MFR: 4 g/10 min (230° C., 21.18 N)) polymerized by using a metallocene catalyst and 30 parts by mass of COC (1) was used as a resin for a cyclic polyolefin resin layer (B). Also, the MLDPE (1) was used as a resin for a resin layer (C). A mixture of 90 parts by mass of linear low-density polyethylene (LLDPE (1)) (density: 0.900 g/cm$^3$, MFR: 3 g/10 min (190° C., 21.18 N)) polymerized by using a metallocene catalyst and 10 parts by mass of the antifogging agent (2) was used as a resin for a sealing layer (A).

A sealant film having a total thickness of 30 μm and a thickness ratio of resin layer (C)/cyclic polyolefin resin layer (B)/sealing layer (A) of 18/6/6 μm was produced by the same method as in Example 2. Next, the resin layer (C) was subjected to corona treatment so as to have a wetting tension of 40 mN/m. The dispersion state of the resultant sealant film was observed by STEM observation of sections in a direction vertical to the flow direction and in a horizontal direction. As a result, a layered phase-separated structure was confirmed in the sections in both the vertical direction and the horizontal direction. The resultant sealant film was laminated with a biaxially stretched nylon film of 15 μm through a polyurethane-based adhesive [DIC DRY LX510/KR90 manufactured by DIC Corporation] to produce a laminate film.

Example 4

A sealant film having a total thickness of 30 μm and a thickness ratio of resin layer (C)/cyclic polyolefin resin layer (B)/sealing layer (A) of 18/3/9 μm was produced by the same method as in Example 2 except that a resin mixture of 85 parts by mass of MRCPP (2) and 15 parts by mass of COC (1) was used as a resin for a cyclic polyolefin resin layer (B). Next, the resin layer (C) was subjected to corona treatment so as to have a wetting tension of 40 mN/m. The dispersion state of the resultant sealant film was observed by STEM observation of sections in a direction vertical to the flow direction and in a horizontal direction. As a result, a layered phase-separated structure was confirmed in the sections in both the vertical direction and the horizontal direction. The resultant film was used for producing a laminate film by lamination through an adhesive according to the same method as in Example 2.

Example 5

A sealant film having a total thickness of 30 μm and a thickness ratio of resin layer (C)/cyclic polyolefin resin layer (B)/sealing layer (A) of 18/3/9 μm was produced by the same method as in Example 2 except that a resin mixture of 60 parts by mass of MRCPP (2) and 40 parts by mass of COC (1) was used as a resin for a cyclic polyolefin resin layer (B). Next, the resin layer (C) was subjected to corona treatment so as to have a wetting tension of 40 mN/m. The dispersion state of the resultant sealant film was observed by STEM observation of sections in a direction vertical to the flow direction and in a horizontal direction. As a result, a layered phase-separated structure was confirmed in the sections in both the vertical direction and the horizontal direction. The resultant sealant film was used for producing a laminate film by lamination through an adhesive according to the same method as in Example 2.

Example 6

A sealant film having a total thickness of 30 μm and a thickness ratio of resin layer (C)/cyclic polyolefin resin layer (B)/sealing layer (A) of 18/3/9 μm was produced by the same method as in Example 2 except that a mixture of 80 parts by mass of MRCPP (1) and 20 parts by mass of the antifogging agent (3) was used as a resin for a sealing layer (A). Next, the resin layer (C) was subjected to corona treatment so as to have a wetting tension of 40 mN/m. The dispersion state of the resultant sealant film was observed by STEM observation of sections in a direction vertical to the flow direction and in a horizontal direction. As a result, a layered phase-separated structure was confirmed in the sections in both the vertical direction and the horizontal direction. The resultant sealant film was used for producing a laminate film by lamination through an adhesive according to the same method as in Example 2.

Example 7

A sealant film having a total thickness of 30 μm and a thickness ratio of resin layer (C)/cyclic polyolefin resin layer (B)/sealing layer (A) of 18/3/9 μm was produced by the same method as in Example 2 except that a mixture of 80 parts by mass of MRCPP (1) and 20 parts by mass of the antifogging agent (4) was used as a resin for a sealing layer (A). Next, the resin layer (C) was subjected to corona treatment so as to have a wetting tension of 40 mN/m. The dispersion state of the resultant sealant film was observed by STEM observation of sections in a direction vertical to the flow direction and in a horizontal direction. As a result, a layered phase-separated structure was confirmed in the sections in both the vertical direction and the horizontal direction. The resultant sealant was used for producing a laminate film by lamination through an adhesive according to the same method as in Example 2.

Example 8

A sealant film having a total thickness of 30 μm and a thickness ratio of resin layer (C)/cyclic polyolefin resin layer (B)/sealing layer (A) of 18/3/9 μm was produced by the same method as in Example 2 except that a resin mixture of 70 parts by mass of MLDPE (1) and 30 parts by mass of a norbornene-based monomer ring-opened polymer (COC (2)) having a glass transition temperature (Tg) of 125° C. and a MFR of 7 g/10 min (230° C., 21.18 N) was used as a resin for a cyclic olefin resin layer (B). Next, the resin layer (C) was subjected to corona treatment so as to have a wetting tension of 40 mN/m. The dispersion state of the resultant sealant film was observed by STEM observation of sections in a direction vertical to the flow direction and in a horizontal direction. As a result, a layered phase-separated structure was confirmed in the sections in both the vertical direction and the horizontal direction. The resultant sealant film was used for producing a laminate film by lamination through an adhesive according to the same method as in Example 2.

Example 9

A sealant film having a total thickness of 25 μm was produced by the same method as in Example 2 except that the thickness ratio of resin layer (C)/cyclic polyolefin resin layer (B)/sealing layer (A) was 6/13/6 μm. Next, the resin layer (C) was subjected to corona treatment so as to have a wetting tension of 40 mN/m. The dispersion state of the resultant sealant film was observed by STEM observation of sections in a direction vertical to the flow direction and in a horizontal direction. As a result, a layered phase-separated structure was confirmed in the sections in both the vertical direction and the horizontal direction. The resultant sealant film was used for producing a laminate film by lamination through an adhesive according to the same method as in Example 2.

Example 10

A sealant film having a total thickness of 50 μm was produced by the same method as in Example 2 except that the thickness ratio of resin layer (C)/cyclic polyolefin resin layer (B)/sealing layer (A) was 15/25/10 μm. Next, the resin layer (C) was subjected to corona treatment so as have a wetting tension of 40 mN/m. The dispersion state of the resultant sealant film was observed by STEM observation of sections in a direction vertical to the flow direction and in a horizontal direction. As a result, a layered phase-separated structure was confirmed in the sections in both the vertical direction and the horizontal direction. The resultant sealant film was used for producing a laminate film by lamination through an adhesive according to the same method as in Example 2.

Comparative Example 1

A mixture of 50 parts by mass of COPP (1)) and 50 parts by mass of the antifogging agent (1) was used as a resin for a sealing layer (A). The resin was supplied to an extruder (aperture 50 mm) for the sealing layer (A) and molten at 200° C. to 250° C. The molten resins was supplied to a co-extrusion multilayer film producing apparatus having a feed block (temperature of feed block and T-die: 250° C.) by a T-die-chill roll method and co-melt-extruded to form a sealant film having a total thickness of 30 μm and a one-layer configuration of the sealing layer (A) as a film layer configuration. Next, corona treatment was performed so as to exhibit a wetting tension of 40 mN/m. The resultant sealant film was used for producing a laminate film by lamination through an adhesive according to the same method as in Example 1.

Comparative Example 2

Homopolypropylene (HOPP) (density: 0.900 g/cm$^3$, MFR: 3 g/10 min (230° C., 21.18 N)) was used as a resin for a resin layer (B), and a mixture of 90 parts by mass of low-density polyethylene (LDPE) (density: 0.920 g/cm$^3$, MFR: 10 g/10 min (190° C., 21.18 N)) and 10 parts by mass of the antifogging agent (2) was used as a resin for a sealing layer (A). A sealant film having a total thickness of 30 μm and a thickness ratio of polyolefin resin layer (B)/sealing layer (A) of 20/10 μm was produced by the same method as in Example 2. Next, the resin layer (B) was subjected to corona treatment so as to have a wetting tension of 40 mN/m. The resultant sealant film was used for producing a laminate film by lamination through an adhesive according to the same method as in Example 1.

Comparative Example 3

High-density polyethylene (HDPE) having a melting point of 125° C. and a MFR of 15 g/10 min (190° C., 21.18 N) was used as a resin for a resin layer (B), and a mixture of 99.9 parts by mass of COPP (1) and 0.1 parts by mass of the antifogging agent (1) was used as a resin for a sealing layer (A). The resins were supplied to an extruder (aperture 50 mm) for the resin layer (B) and an extruder (aperture 50 mm) for the sealing layer (A), respectively, and molten at 200° C. to 250° C. The molten resins were supplied to a co-extrusion multilayer film producing apparatus having a feed block (temperature of feed block and T-die: 250° C.) by a T-die-chill roll method and co-melt-extruded to form a sealant film having a total thickness of 30 μm and, as a film layer configuration, a two-layer configuration of polyolefin resin layer (B)/sealing layer at a thickness ratio of 20/10 μm. Next, the resin layer (B) was subjected to corona treatment so as to exhibit a wetting tension of 39 mN/m. The resultant sealant film was used for producing a laminate film by lamination through an adhesive according to the same method as in Example 1.

Comparative Example 4

A sealant film having a total thickness of 30 μm and a thickness ratio of resin layer (C)/resin layer (B)/sealing layer (A) of 18/3/9 μm was produced by the same method as in Example 2 except that MRCPP (2) was used as a resin for the resin layer (B). Next, the resin layer (C) was subjected to corona treatment so as to exhibit a wetting tension of 40 mN/m. The resultant sealant film was used for producing a laminate film by lamination through an adhesive according to the same method as in Example 2.

The laminate films produced in the examples and the comparative examples were evaluated as described below. The obtained results are shown in tables. In the tables, the content of each of the mixed components in each of the layers is shown as a ratio by mass in the layer.

[Evaluation of Appearance of Film After Aging]

The appearance of a sample prepared by aging, at 38° C. for 48 hours, a film extruded from the T die by the co-extrusion method was confirmed by visual observation.

A: Substantially no deposition/whitening due to bleeding of the antifogging agent was observed.

B: Much deposition/whitening due to bleeding of the antifogging agent and film tackiness were observed.

[Evaluation of Laminate Strength]

The behavior of laminate strength between the film stretched substrate and the sealant film of the resultant laminate film was evaluated by observing the state of the laminate film peeled at a rate of 300 mm/min using a tensile testing machine (manufactured by A & D Co., Ltd.) according to criteria below.

A: Strong bonding between the film stretched substrate and the sealant film was confirmed by holding sufficient laminate strength.

B: Easy peeling between the film stretched substrate and the sealant film was confirmed by the lack of laminate strength.

[Test of Confirming Antifogging Effect Before and After Lamination]

A sealant film before lamination and a laminate film after lamination were aged in an environment of 40° C. for 48 hours, then cut into a size of 8 cm×8 cm, heat-sealed (pressure of 64 kgf/cup, temperature of 150° C., time of 0.8 seconds) with a 71φ injection container (manufactured by Toko, Inc.) in which 30 ml of water of 40° C. was placed, stored in a low-temperature room of 3° C. for 3 hours, and then confirmed with respect to the antifogging effect by visual observation according to criteria below.

The same evaluation was performed for the sealant film before lamination.

A: A continuous water film was formed on a surface of the film and good visibility was exhibited.

B: Fine water droplets adhered to a surface of the film, but good visibility was exhibited.

C: Water droplets adhered and poor visibility was exhibited.

[Packaging Machine Suitability]

The laminate film after lamination formed in each of the examples and the comparative examples was formed into a bag by longitudinal pillow packaging using an automatic packaging machine as described below.

Packaging machine: Gorika Giken Co., Ltd., Daiken Co., Ltd. Daiken DK240V

Transverse sealing: The resin layers (C) were sealed together at a speed of 30 bags/min, longitudinal heat sealing temperature of 150° C., and an air gauge pressure of 4 kg/cm$^2$ while the transverse heat sealing temperature was changed from 130° C. to 170° C. at an interval of 10° C. As a result, a flat bag of 200 mm in length and 150 mm in width was formed.

The film formed into a bag under the conditions described above was naturally cooled at 23° C. and cut into a strip test piece of 15 mm in width. The test piece was subjected to 180° peeling at a speed of 300 mm/min by using a tensile testing machine (manufactured by A & D Co., Ltd.) in a constant-temperature room of 23° C. and 50% RH, and heat seal strength was measured. Heat sealability was evaluated from the obtained value of heat seal strength according to criteria below.

A: Heat seal strength of 500 g/15 mm width or more.

B: Heat seal strength of less than 500 g/15 mm width.

[Section Observation]

Observation was performed by STEM (Scanning Transmission Electron Microscope) function attached to 7500FA manufactured by JEOL Ltd.

The results of evaluation are summarized in the tables below.

TABLE 1

|  |  |  | Example 1 | Example 2 | Example 3 | Example 4 | Example 5 | Example 6 | Example 7 |
|---|---|---|---|---|---|---|---|---|---|
| Composition of resin layer | Sealing layer (A) | MRCPP(1) | 80 | 80 |  | 80 | 80 | 80 | 80 |
|  |  | LLDPE(1) |  |  | 90 |  |  |  |  |
|  |  | Antifogging agent (1) | 20 | 20 |  | 20 | 20 |  |  |
|  |  | Antifogging agent (2) |  |  | 10 |  |  |  |  |
|  |  | Antifogging agent (3) |  |  |  |  |  | 20 |  |
|  |  | Antifogging agent (4) |  |  |  |  |  |  | 20 |
|  | Resin layer (B) | MLDPE(1) |  |  | 70 |  |  |  |  |
|  |  | COPP(1) | 70 |  |  |  |  |  |  |
|  |  | MRCPP(2) |  | 70 |  | 85 | 60 | 70 | 70 |
|  |  | COC(1) | 30 | 30 | 30 | 15 | 40 | 30 | 30 |
|  |  | Cyclic olefin resin content (% by mass) | 30 | 30 | 30 | 15 | 40 | 30 | 30 |
|  | Resin layer (C) | MRCPP(1) |  | 100 |  | 100 | 100 | 100 | 100 |
|  |  | MLDPE(1) |  |  | 100 |  |  |  |  |
| Layer configuration of film | Thickness of resin layer (A) (µm) |  | 6 | 9 | 6 | 9 | 9 | 9 | 9 |
|  | Thickness of resin layer (B) (µm) |  | 24 | 3 | 6 | 3 | 3 | 3 | 3 |
|  | Thickness of resin layer (C) (µm) |  | — | 18 | 18 | 18 | 18 | 18 | 18 |
|  | Film total thickness (µm) |  | 30 | 30 | 30 | 30 | 30 | 30 | 30 |
|  | Thickness ratio of resin layer (B) to film total thickness (%) |  | 80 | 10 | 20 | 10 | 10 | 10 | 10 |
|  | Thickness ratio of resin layer (A) to film total thickness (%) |  | 20 | 30 | 20 | 30 | 30 | 30 | 30 |
| Evaluation result | Stretched substrate |  | PET | PET | NY | PET | PET | PET | PET |
|  | Film appearance (whitening) |  | A | A | A | A | A | A | A |
|  | Laminate strength |  | A | A | A | A | A | A | A |
|  | Antifogging property before lamination |  | A | A | A | A | A | A | A |
|  | Antifogging property after lamination |  | A | A | A | A | A | A | A |
| Packaging machine suitability | (Fin Seal) transverse sealability | 120 | A | A | A | A | A | A | A |
|  |  | 130 | A | A | A | A | A | A | A |
|  |  | 140 | A | A | A | A | A | A | A |
|  |  | 150 | A | A | A | A | A | A | A |
|  |  | 160 | A | A | A | A | A | A | A |

TABLE 2

|  |  |  | Example 8 | Example 9 | Example 10 | Comparative Example 1 | Comparative Example 2 | Comparative Example 3 | Comparative Example 4 |
|---|---|---|---|---|---|---|---|---|---|
| Composition of resin layer | Sealing layer (A) | MRCPP(1) | 80 | 80 | 80 |  |  |  | 80 |
|  |  | COPP(1) |  |  |  | 50 |  | 99.9 |  |
|  |  | LDPE |  |  |  |  | 90 |  |  |
|  |  | Antifogging agent (1) | 20 | 20 | 20 | 50 |  | 0.1 | 20 |
|  |  | Antifogging agent (2) |  |  |  |  | 10 |  |  |
|  | Resin layer (B) | MRCPP(2) | 70 | 70 | 70 |  |  |  | 100 |
|  |  | COC(1) |  | 30 | 30 |  |  |  |  |
|  |  | COC(2) | 30 |  |  |  |  |  |  |
|  |  | HOPP |  |  |  |  | 100 |  |  |
|  |  | HDPE |  |  |  |  |  | 100 |  |
|  |  | Cyclic olefin resin content (% by mass) | 30 | 30 | 30 |  |  |  |  |
|  | Resin layer (C) | MRCPP(1) | 100 | 100 | 100 |  |  |  | 100 |
| Layer configuration of film | Thickness of resin layer (A) (µm) |  | 9 | 6 | 10 | 30 | 10 | 10 | 9 |
|  | Thickness of resin layer (B) (µm) |  | 3 | 13 | 25 | — | 20 | 20 | 3 |
|  | Thickness of resin layer (C) (µm) |  | 18 | 6 | 15 | — | — | — | 18 |
|  | Film total thickness (µm) |  | 30 | 25 | 50 | 30 | 30 | 30 | 30 |
|  | Thickness ratio of resin layer (B) to film total thickness (%) |  | 10 | 52 | 50 | — | 66.7 | 66.7 | 10 |
|  | Thickness ratio of resin layer (A) to film total thickness (%) |  | 30 | 24 | 20 | 100 | 33.3 | 33.3 | 30 |
| Evaluation result | Stretched substrate |  | PET | PET | PET | PET | OPP | OPP | PET |
|  | Film appearance (whitening) |  | A | A | A | B | A | A | A |
|  | Laminate strength |  | A | A | A | B | A | A | A |
|  | Antifogging property before lamination |  | A | A | A | A | A | B | A |
|  | Antifogging property after lamination |  | A | A | A | C | C | C | C |

TABLE 2-continued

|  |  |  | Example | | | Comparative Example | | | |
| --- | --- | --- | --- | --- | --- | --- | --- | --- | --- |
|  |  |  | 8 | 9 | 10 | 1 | 2 | 3 | 4 |
| Packaging machine suitability | (Fin Seal) transverse sealability | 120 | A | A | A | B | B | B | A |
|  |  | 130 | A | A | A | B | B | B | A |
|  |  | 140 | A | A | A | A | B | B | A |
|  |  | 150 | A | A | A | A | B | B | A |
|  |  | 160 | A | A | A | A | B | B | A |

The tables indicate that the sealant films of Examples 1 to 3 have both the good antifogging property and excellent seal strength.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. A sealant film used by being laminated on a substrate, the sealant film comprising:
    a sealing layer comprising a first polyolefin resin and an antifogging agent; and
    a first resin layer comprising 10% to 40% by mass of a cyclic polyolefin resin and 60% to 90% by mass of a second polyolefin resin,
    wherein the second polyolefin resin is not a cyclic polyolefin resin,
    wherein the first resin layer is disposed on a surface of the sealing layer, and has a phase-separated structure in which the cyclic polyolefin resin is dispersed in the form of a layer in the second polyolefin resin,
    wherein the cyclic polyolefin resin is a copolymer comprising 75% by mass or less of a norbornene-based monomer, and
    wherein the norbornene-based monomer is an alicyclic monomer having a norbornene ring.

2. The sealant film according to claim 1, wherein a glass transition temperature of the cyclic polyolefin resin is 70° C. to 160° C.

3. The sealant film according to claim 1, wherein a content of the antifogging agent in the sealing layer is 0.2% to 5% by mass.

4. The sealant film according to claim 1, further comprising a second resin layer provided on a surface of the first resin layer apart from the sealing layer, wherein the second resin layer comprises a polyolefin resin free of a cyclic structure.

5. A laminate film, comprising:
    a substrate;
    an adhesive layer; and
    the sealant film according to claim 1,
    wherein the substrate is laminated, through the adhesive layer, on a surface of the sealant film other than the sealing layer of the sealant film.

6. The sealant film according to claim 1, wherein the cyclic polyolefin resin is a copolymer comprising 70% by mass or less of the norbornene-based monomer.

7. The sealant film according to claim 1, wherein the norbornene-based monomer is selected from the group consisting of norbornene, tetracyclododecene, ethylidene norbornene, vinyl norbornene, ethylidene tetracyclododecene, dicyclopentadiene, dimetanotetrahydrofluorene, phenyl norbornene, methoxycarbonyl norbornene, and methoxycarbonyl tetracyclododecene.

8. The sealant film according to claim 1, wherein the phase-separated structure comprises a plurality of thin layers of the cyclic polyolefin resin, each thin layer having a thickness of about 20 to 100 nm.

9. A sealant film used by being laminated on a substrate, the sealant film comprising:
    a sealing layer comprising a first polyolefin resin and an antifogging agent; and
    a first resin layer comprising 10% to 40% by mass of a cyclic polyolefin resin and 60% to 90% by mass of a second polyolefin resin,
    wherein the second polyolefin resin is not a cyclic polyolefin resin,
    wherein the first resin layer is disposed on a surface of the sealing layer,
    wherein a melt flow rate (230° C., 21.18 N) of the cyclic polyolefin resin is 5 to 20 g/10 min, and a melt flow rate (230° C., 21.18 N) of the second polyolefin resin is 0.5 to 4.0 g/10 min,
    wherein the cyclic polyolefin resin is a copolymer comprising 75% by mass or less of a norbornene-based monomer, and
    wherein the norbornene-based monomer is an alicyclic monomer having a norbornene ring.

10. The sealant film according to claim 9, wherein a glass transition temperature of the cyclic polyolefin resin is 70° C. to 160° C.

11. The sealant film according to claim 9, wherein a content of the antifogging agent in the sealing layer is 0.2% to 5% by mass.

12. The sealant film according to claim 9, further comprising a second resin layer provided on a surface of the first resin layer apart from the sealing layer, wherein the second resin layer comprises a polyolefin resin free of a cyclic structure.

13. A laminate film, comprising:
    a substrate;
    an adhesive layer; and
    the sealant film according to claim 9,
    wherein the substrate is laminated, through the adhesive layer, on a surface of the sealant film other than the sealing layer of the sealant film.

14. The sealant film according to claim 9, wherein the cyclic polyolefin resin is a copolymer comprising 70% by mass or less of the norbornene-based monomer.

15. The sealant film according to claim 9, wherein the norbornene-based monomer is selected from the group consisting of norbornene, tetracyclododecene, ethylidene norbornene, vinyl norbornene, ethylidene tetracyclododecene, dicyclopentadiene, dimetanotetrahydrofluorene, phenyl norbornene, methoxycarbonyl norbornene, and methoxycarbonyl tetracyclododecene.

16. The sealant film according to claim 9, wherein the first resin layer has a phase-separated structure comprising a plurality of thin layers of the cyclic polyolefin resin, each thin layer having a thickness of about 20 to 100 nm.

* * * * *